(12) United States Patent
Joshi et al.

(10) Patent No.: US 12,475,009 B1
(45) Date of Patent: Nov. 18, 2025

(54) CONTINUING TO TEST A HARDWARE COMPONENT AFTER OCCURRENCE OF A CHECKSTOP

(71) Applicant: International Business Machines Corporation, Armonk, NY (US)

(72) Inventors: Divya Kumudprakash Joshi, Hobli (IN); Edward J. Kaminski, Jr., Wynnewood, PA (US); Kyle Davis, Pflugerville, TX (US); Shaun Thomas Uldrikis, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/894,242

(22) Filed: Sep. 24, 2024

(51) Int. Cl.
*G06F 11/00* (2006.01)
*G06F 11/26* (2006.01)

(52) U.S. Cl.
CPC .................................. *G06F 11/261* (2013.01)

(58) Field of Classification Search
CPC ...................................................... G06F 11/261
See application file for complete search history.

(56) References Cited

U.S. PATENT DOCUMENTS

| | | |
|---|---|---|
| 6,550,022 B1 | 4/2003 | Faver |
| 7,827,443 B2 | 11/2010 | Eisen et al. |
| 7,958,392 B2 | 6/2011 | Armstrong et al. |
| 7,966,536 B2 | 6/2011 | Ludewig et al. |
| 8,073,668 B2 | 12/2011 | Kellington et al. |
| 8,949,101 B2 | 2/2015 | Bose et al. |
| 10,223,186 B2 | 3/2019 | Hollaway, Jr. et al. |
| 10,318,406 B2 | 6/2019 | Erez et al. |
| 10,579,499 B2 | 3/2020 | Engler et al. |
| 11,822,675 B2 | 11/2023 | Das et al. |
| 11,989,071 B2 | 5/2024 | Webel et al. |
| 2006/0184840 A1 | 8/2006 | Floyd et al. |

(Continued)

OTHER PUBLICATIONS

Barbosa et al., "Assembly-Level Pre-Injection Analysis for Improving Fault Injection Efficiency," Lecture Notes in Computer Science, 2005, pp. 246-262.

(Continued)

*Primary Examiner* — Jason B Bryan
(74) *Attorney, Agent, or Firm* — Shackelford, McKinley & Norton, LLP; Robert A. Voigt, Jr.

(57) ABSTRACT

A computer-implemented method, system, and computer program product for testing hardware in an environment involving a checkstop. Errors are injected into a model of a design under test (DUT), which includes a first hardware component interfaced with a second hardware component, at various states causing an occurrence of a checkstop in the first hardware component. A simulation of the model of the DUT is then performed with the injected errors for a number of cycles after the checkstop based on a quiesce time where the injected errors are suppressed. Furthermore, a post-processing script is executed to test a model of the DUT which ignores the errors of the first hardware component that were identified after the checkstop in the simulation of the model of the DUT. Any non-ignored errors from the execution of the post-processing script are detected and analyzed to determine if the second hardware component failed the test.

20 Claims, 4 Drawing Sheets

(56) References Cited

U.S. PATENT DOCUMENTS

2008/0235454 A1   9/2008  Duron et al.
2013/0096902 A1*  4/2013  Bose ............... G01R 31/31816
                                                              703/14

OTHER PUBLICATIONS

Kudva et al., "Fault Injection Verification of IBM Power6 Soft Error Resilience," Workshop on Architectural Support for Gigascale Integration (ASGI), 2007, pp. 1-4.
Rivers et al., "Phaser: Phased Methodology for Modeling the System-Level Effects of Soft Errors," IBM Journal of Research and Development, vol. 52, No. 3, May 2008, pp. 293-306.
Ramachandran et al., "Statistical Fault Injection," International Conference on Dependable Systems & Networks, Anchorage, Alaska, Jun. 24-27, 2008, pp. 122-127.
Cher et al., "Understanding Soft Error Resiliency of BlueGene/Q Compute Chip Through Hardware Proton Irradiation and Software Fault Injection," International Conference for High Performance Computing, Networking, Storage and Analysis, 2014, pp. 587-596.

* cited by examiner

CONTINUING TO TEST A HARDWARE COMPONENT AFTER OCCURRENCE OF A CHECKSTOP

TECHNICAL FIELD

The present disclosure relates generally to testing hardware components, and more particularly to continuing to test a hardware component after the occurrence of a checkstop.

BACKGROUND

Electronic components or systems are tested for its functionality, performance, or other specifications. The purpose of the testing is to ensure that such components or systems meet the desired standards, identify any defects, and improve its design or quality. Examples of such testing include stress testing, functional testing, and environmental testing to ensure that the components or systems fully comply with design specifications and industry standards.

SUMMARY

In one embodiment of the present disclosure, a computer-implemented method for testing hardware in an environment involving a checkstop comprises injecting errors into a model of a design under test comprising a first hardware component and a second hardware component at various states causing an occurrence of a checkstop in the first hardware component, where the first hardware component is interfaced with the second hardware component. The method further comprises performing a simulation of the model of the design under test with the injected errors for a number of cycles after the checkstop based on a quiesce time where the injected errors are suppressed. The method additionally comprises executing a post-processing script to test the model of the design under test which ignores errors of the first hardware component that were identified after the checkstop in the simulation of the model of the design under test. Furthermore, the method comprises analyzing any non-ignored error from the execution of the post-processing script. Additionally, the method comprises outputting an indication that the second hardware component failed the test after the occurrence of the checkstop in response to the analyzed error causing the model of the design under test to fail the test.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated above, electronic components or systems are tested for its functionality, performance, or other specifications. The purpose of the testing is to ensure that such components or systems meet the desired standards, identify any defects, and improve its design or quality. Examples of such testing include stress testing, functional testing, and environmental testing to ensure that the components or systems fully comply with design specifications and industry standards.

Such components or systems being tested may be subjected to a checkstop. A checkstop is a machine check that occurs during another machine check. A checkstop also occurs when the machine (usually a processor but sometimes a cache, memory, or I/O bus controller) determines that something is in an "impossible" state. For example, a checkstop results when an error occurs that cannot be isolated to a particular bus transfer in progress, or when a processor detects no progress being made. In another example, a checkstop results when the processor is not able to complete any instructions for some period of time.

When a system checkstops, the clocks in the machine are frozen within a few cycles after the error and the service processor saves the part of the state of the processors. It then attempts to perform a full hardware reset and restart the system a number of times.

When the system reboots, the data is copied to a file, such as in the/usr/lib/ras directory (ras stands for reliability and service). Two file names (checkstop.A and checkstop.B) may be used in a rotating manner. The total number of checkstops that occurred during the reboot attempts, before the system came up successfully, is logged in the error log entry along with the file name.

If a second machine check occurs before the operating system completes logging the error and initiates a complete hardware reset or halts, the processor will checkstop.

After the occurrence of a checkstop in which the computer system is forcibly rebooted, testing of the hardware of the computer system is prevented, including other hardware components that may not be directly involved with the error causing the checkstop. For example, even in the scenario in which two hardware components are interfaced together and only one of the hardware components were involved with the error causing the checkstop, the further testing of the other hardware component cannot be performed.

Hence, there is no existing methodology to continue to test hardware components after a checkstop.

The embodiments of the present disclosure provide a means for testing hardware in an environment involving a checkstop. In one embodiment, errors are injected into a model of a design under test, which includes a first hardware component (e.g., coherence fabric) interfaced with a second hardware component (e.g., L3 cache), at various states (representing a snap-shot of the modelled component at a given cycle) causing an occurrence of a checkstop in the first hardware component. A simulation of the model of the design under test is then performed with the injected errors for a number of cycles after the checkstop based on a quiesce time (amount of time required to render a computer system inactive) where the injected errors are suppressed. A post-processing script may then be executed to test (e.g., functional testing) a model of the design under test which ignores the errors of the first hardware component that were identified after the checkstop in the simulation of the model of the design under test. Any non-ignored errors from the execution of the post-processing script are detected and analyzed. Based on the analysis of such errors, a determination is made as to whether such an error would cause the model of the design under test to fail the test. If the analyzed error causes the model of the design under test to fail the test, an indication is outputted indicating that the second hardware component failed the test. Otherwise, an indication is outputted indicating that the second hardware component did not fail the test. In this manner, a hardware component may continue to be tested in an environment involving a checkstop. A further description of these and other features will be provided below.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
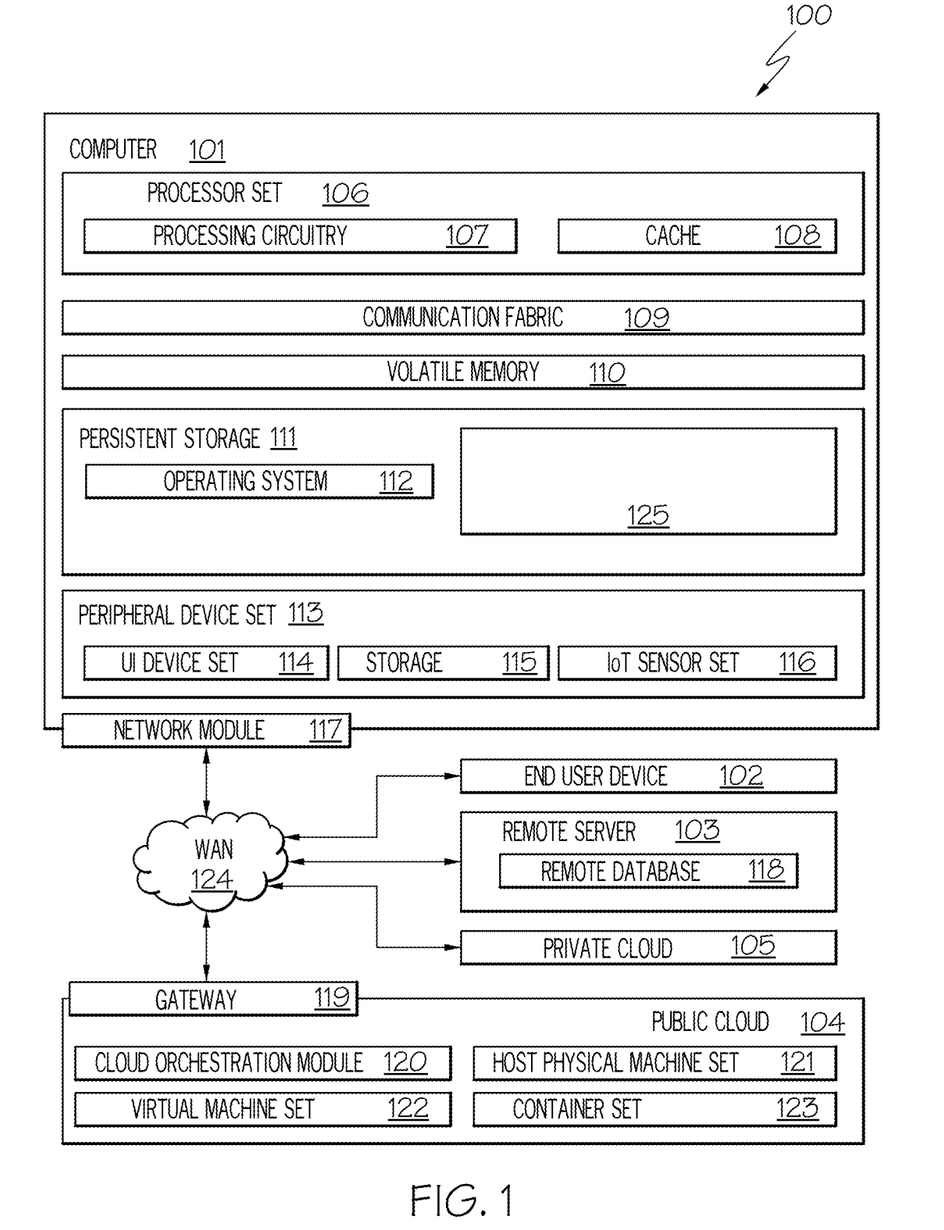
FIG. 1 illustrates an embodiment of the present disclosure of a computing environment for practicing the principles of the present disclosure.

Referring now to the Figures in detail, FIG. 1 illustrates an embodiment of the present disclosure of a computing environment 100 for practicing the principles of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code (stored in block 125) involved in performing the inventive methods, such as continuing to test a hardware component in an environment involving a checkstop. In addition to block 125, computing environment 100 includes, for example, computer 101, network 124, such as a wide area network (WAN), end user device (EUD) 102, remote server 103, public cloud 104, and private cloud 105. In this embodiment, computer 101 includes processor set 106 (including processing circuitry 107 and cache 108), communication fabric 109, volatile memory 110, persistent storage 111 (including operating system 112 and block 125, as identified above), peripheral device set 113 (including user interface (UI) device set 114, storage 115, and Internet of Things (IoT) sensor set 116), and network module 117. Remote server 103 includes remote database 118. Public cloud 104 includes gateway 119, cloud orchestration module 120, host physical machine set 121, virtual machine set 122, and container set 123.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 118. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 106 includes one, or more, computer processors of any type now known or to be developed in the future. Processing circuitry 107 may be distributed over multiple packages, for example, multiple, coordinated integrated circuit chips. Processing circuitry 107 may implement multiple processor threads and/or multiple processor cores. Cache 108 is memory that is located in the processor chip package(s) and is typically used for data or code that should be available for rapid access by the threads or cores running on processor set 106. Cache memories are typically organized into multiple levels depending upon relative proximity to the processing circuitry. Alternatively, some, or all, of the cache for the processor set may be located "off chip." In some computing environments, processor set 106 may be designed for working with qubits and performing quantum computing.

Computer readable program instructions are typically loaded onto computer 101 to cause a series of operational steps to be performed by processor set 106 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 108 and the other storage media discussed below. The program instructions, and associated data, are accessed by processor set 106 to control and direct performance of the inventive methods. In computing environment 100, at least some of the instructions for performing the inventive methods may be stored in block 125 in persistent storage 111.

Communication fabric 109 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 110 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 110 is located in a single package and is internal to computer 101, but, alternatively or additionally, the volatile memory may be distributed over multiple packages and/or located externally with respect to computer 101.

Persistent Storage 111 is any form of non-volatile storage for computers that is now known or to be developed in the future. The non-volatility of this storage means that the stored data is maintained regardless of whether power is being supplied to computer 101 and/or directly to persistent storage 111. Persistent storage 111 may be a read only memory (ROM), but typically at least a portion of the persistent storage allows writing of data, deletion of data and re-writing of data. Some familiar forms of persistent storage include magnetic disks and solid state storage devices. Operating system 112 may take several forms, such as various known proprietary operating systems or open source Portable Operating System Interface type operating systems that employ a kernel. The code included in block 125 typically includes at least some of the computer code involved in performing the inventive methods.

Peripheral device set 113 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 114 may include components such as a display screen, speaker, microphone, wearable devices (such as goggles and smart watches), keyboard, mouse, printer, touchpad, game controllers, and haptic devices. Storage 115 is external storage, such as an external hard drive, or insertable storage, such as an SD card. Storage 115 may be persistent and/or volatile. In some embodiments, storage 115 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 116 is made up of sensors that can be used in Internet of Things applications. For example, one sensor may be a thermometer and another sensor may be a motion detector.

Network module 117 is the collection of computer software, hardware, and firmware that allows computer 101 to communicate with other computers through WAN 124. Network module 117 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 117 are performed on the same physical hardware device. In other embodiments (for example, embodiments that utilize software-defined networking (SDN)), the control functions and the forwarding functions of network module 117 are performed on physically separate devices, such that the control functions manage several different network hardware devices. Computer readable program instructions for performing the inventive methods can typically be downloaded to computer 101 from an external computer or external storage device through a network adapter card or network interface included in network module 117.

WAN 124 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 102 is any computer system that is used and controlled by an end user (for example, a customer of an enterprise that operates computer 101), and may take any of the forms discussed above in connection with computer 101. EUD 102 typically receives helpful and useful data from the operations of computer 101. For example, in a hypothetical case where computer 101 is designed to provide a recommendation to an end user, this recommendation would typically be communicated from network module 117 of computer 101 through WAN 124 to EUD 102. In this way, EUD 102 can display, or otherwise present, the recommendation to an end user. In some embodiments, EUD 102 may be a client device, such as thin client, heavy client, mainframe computer, desktop computer and so on.

Remote server 103 is any computer system that serves at least some data and/or functionality to computer 101.

Remote server 103 may be controlled and used by the same entity that operates computer 101. Remote server 103 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 118 of remote server 103.

Public cloud 104 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 104 is performed by the computer hardware and/or software of cloud orchestration module 120. The computing resources provided by public cloud 104 are typically implemented by virtual computing environments that run on various computers making up the computers of host physical machine set 121, which is the universe of physical computers in and/or available to public cloud 104. The virtual computing environments (VCEs) typically take the form of virtual machines from virtual machine set 122 and/or containers from container set 123. It is understood that these VCEs may be stored as images and may be transferred among and between the various physical machine hosts, either as images or after instantiation of the VCE. Cloud orchestration module 120 manages the transfer and storage of images, deploys new instantiations of VCEs and manages active instantiations of VCE deployments. Gateway 119 is the collection of computer software, hardware, and firmware that allows public cloud 104 to communicate through WAN 124.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 105 is similar to public cloud 104, except that the computing resources are only available for use by a single enterprise. While private cloud 105 is depicted as being in communication with WAN 124 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 104 and private cloud 105 are both part of a larger hybrid cloud.

Figure 3:
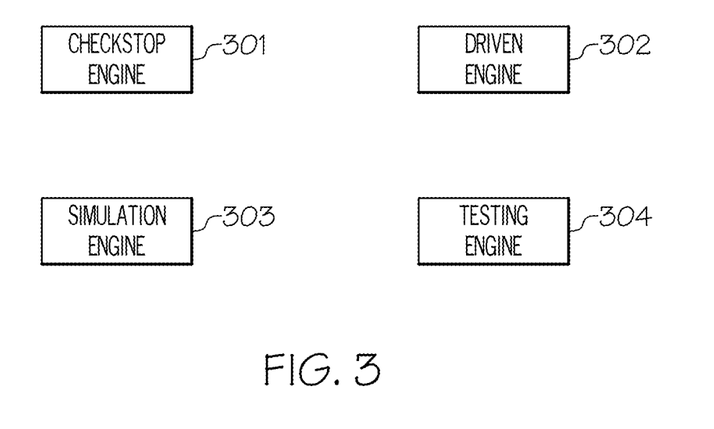
FIG. 3 is a diagram of the software components used by the computer to continue to test a hardware component in an environment involving a checkstop, including such a hardware component that is interfaced with a checkstopped hardware component, in accordance with an embodiment of the present disclosure.

Block 125 further includes the software components discussed herein in connection with FIG. 3 to enable the continuing of testing a hardware component in an environment involving a checkstop. In one embodiment, such components may be implemented in hardware. The functions discussed above performed by such components are not generic computer functions. As a result, computer 101 is a particular machine that is the result of implementing specific, non-generic computer functions.

In one embodiment, the functionality of such software components of computer 101, including the functionality for continuing to test a hardware component in an environment involving a checkstop, may be embodied in an application specific integrated circuit.

An embodiment of computer 101 involving the testing of hardware components located in an environment with a checkstop is discussed below in connection with FIG. 2.

Figure 2:
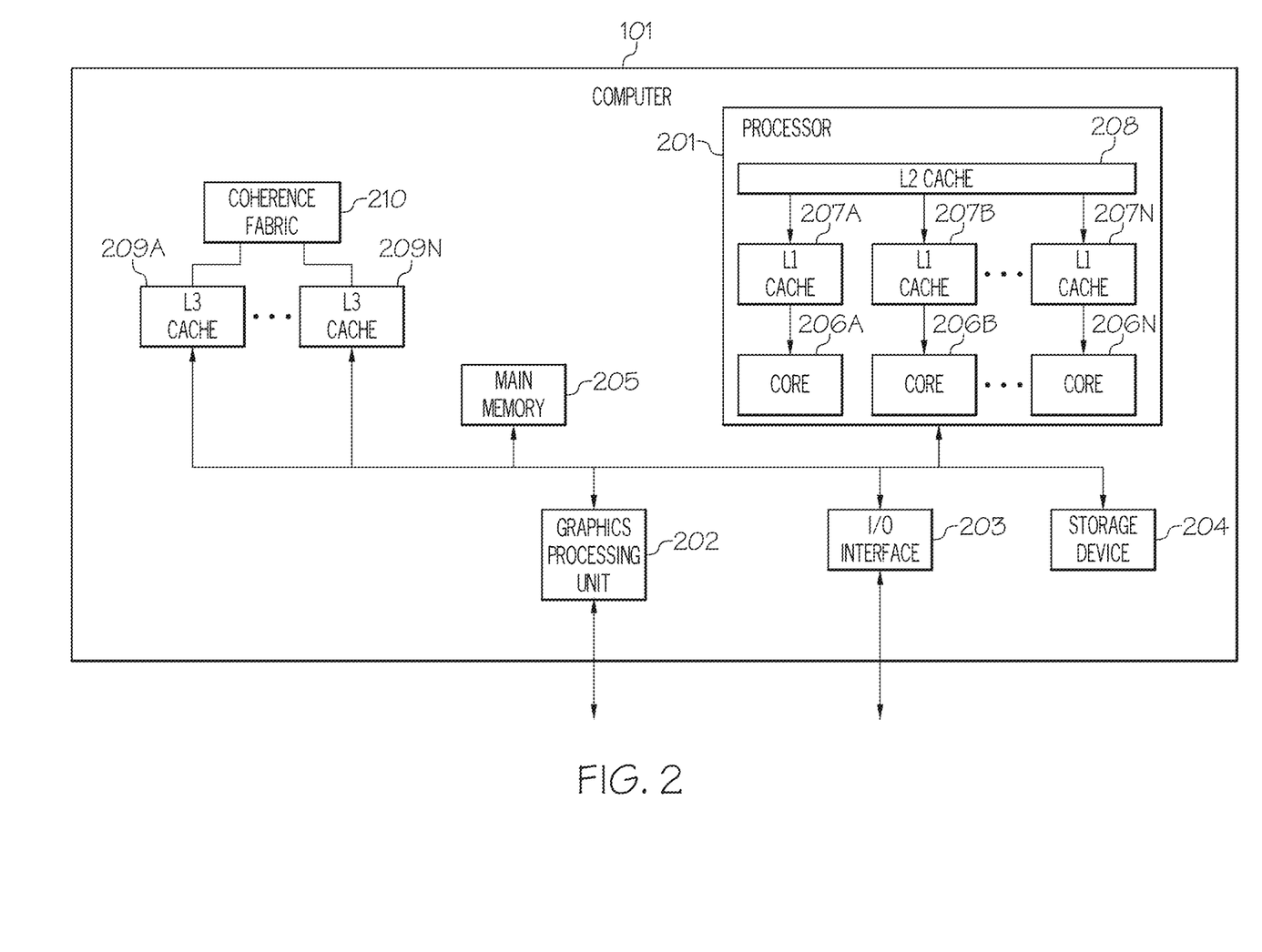
FIG. 2 illustrates an exemplary architecture of a computer in accordance with an embodiment of the present disclosure.

FIG. 2 illustrates an exemplary architecture of computer 101 in accordance with an embodiment of the present disclosure.

Referring now to FIG. 2, in conjunction with FIG. 1, computer 101 includes a processor 201 (e.g., processing circuitry 107), graphics processing unit (GPU) 202, input/output (IO) interface 203, a storage device 204, and main memory 205, While FIG. 2 illustrates a single processor 201, it is noted that computer 101 may include multiple processors 201, such as in a multiprocessing system.

In one embodiment, graphics processing unit (GPU) 202 receives graphics data, for example, 2-dimensional and 3-dimensional graphics data, from processor 201. GPU 202 may perform one or more computations to manipulate the graphics data, and render images on a display screen.

In one embodiment, I/O interface 203 provides an interface between processor 201 and an input/output device. Exemplary input devices include, for example, keyboards, keypads, light-pens, touch-screens, track-balls, speech recognition units, audio/video players, and the like. An output device can be any device to give output to the user, e.g., any conventional display screen.

In one embodiment, storage device 204 is a Direct Access Storage Device (DASD).

Although it is shown as a single unit, it could be a combination of fixed and/or removable storage devices, such as fixed disc drives, floppy disc drives, tape drives, removable memory cards or optical storage. In one embodiment, main memory 205 and L1 cache 207 (discussed further below) could be part of one virtual address space spanning multiple primary and secondary storage devices.

In one embodiment, main memory 205 is random access memory sufficiently large to hold the necessary programming and data structures operated on by processor 201. While main memory 205 is shown as a single entity, it should be understood that main memory 205 may in fact comprise a plurality of modules, and that main memory 205 may exist at multiple levels, for example, L3 cache, 14 cache, and main memory.

In one embodiment, processor 201 may include a plurality of processor cores 206A-206N, where N is a positive integer number. Processor cores 206A-206N may collectively or individually be referred to as processor cores 206 or processor core 206, respectively. In one embodiment, processor core 206 is configured to perform pipelined execution of instructions retrieved from main memory 205.

In one embodiment, each processor core 206A-206N may have an associated L1 cache 207A-207N, where N is a positive integer number. L1 caches 207A-207N may collectively or individually be referred to as L1 caches 207 or L1 cache 207, respectively. Each L1 cache 207 may be a relatively small memory cache located closest to an associated processor core 206 and may be configured to give the associated processor 201 fast access to instructions and data (collectively referred to henceforth as data).

Processor 201 may also include at least one L2 cache 208. While FIG. 2 illustrates a single L2 cache 208, it is noted that processor 201 may include any number of L2 caches 208, In one embodiment, L2 cache 208 may be relatively larger than L1 cache 207. Each L2 cache 208 may be associated with one or more L1 caches 207, and may be configured to provide data to the associated one or more L1 caches 207. For example, processor core 206 may request data that is not contained in its associated L1 cache 207. Consequently, data requested by processor core 206 may be retrieved from L2 cache 208 and stored in L1 cache 207 associated with processor core 206, In one embodiment, L1 cache 207, and L2 cache 208 are SRAM (static random access memory) based devices. However, one skilled in the art will recognize that L1 cache 207 and L2 cache 208 may be any other type of memory, for example, DRAM (dynamic random access memory).

If a cache miss occurs in L2 cache 208, data requested by processor core 206 may be retrieved from an L3 cache 209A-209N, where N is a positive integer number. L3 caches 209A-209N may collectively or individually be referred to as L3 caches 209 or L3 cache 209, respectively.

In one embodiment, coherence fabric 210 is connected to L3 caches 209 to ensure cache coherency. Cache coherence is the uniformity of shared resource data that ends up stored in multiple local caches, such as L3 caches 209. When clients in a system maintain caches of a common memory resource, problems may arise with incoherent data (copies of the data in the caches do not reflect the latest version of the data, which may have changed), which is particularly the case in a multiprocessing system. Coherence fabric 210, as used herein, refers to the physical and logical arrangement, such as the connections between devices that ensure write propagation (changes to the data in a cache need to be propagated to other copies in the peer caches) and transaction serialization (reads/writes to a single memory location need to be seen by all processors in the same order).

In one embodiment, each L3 cache 209 is associated with a plurality of L2 caches 208, and each L3 cache 209 is configured to exchange data with the associated L2 cache 208. In one embodiment, each higher level cache is associated with one or more caches of the next lower level.

As discussed above, after the occurrence of a checkstop in which the computer system (e.g., computer 101) is forcibly rebooted, testing of the hardware of the computer system is prevented, including other hardware components that may not be directly involved with the error causing the checkstop. For example, even in the scenario in which two hardware components are interfaced together, such as L3 cache 209 and coherence fabric 210, and only one of the hardware components (e.g., coherence fabric 210) was involved with the error causing the checkstop, the further testing of the other hardware component (e.g., L3 cache 209) cannot be performed. For instance, L3 cache 209 and coherence fabric 210 are interfaced together. If coherence fabric 210 was involved in the error causing the checkstop, it may be desirable to be able to test L3 cache 209 after the occurrence of the checkstop. A discussion regarding enabling the further testing of the hardware component, such as the hardware component not involved with the error causing the checkstop, after the occurrence of the checkstop is provided below in connection with FIG. 3.

FIG. 3 is a diagram of the software components used by computer 101 to continue to test a hardware component (e.g., L3 cache 209) in an environment involving a checkstop, including such a hardware component that is interfaced with a checkstopped hardware component, in accordance with an embodiment of the present disclosure.

Referring to FIG. 3, in conjunction with FIGS. 1-2, computer 101 includes checkstop engine 301 configured to inject errors into a model of a design under test, which includes a first hardware component (e.g., coherence fabric 210) interfaced with a second hardware component (e.g., L3 cache 209), at various states causing an occurrence of a checkstop in the first hardware component. That is, errors are injected into the model of the design under test to cause the first hardware component (e.g., coherence fabric 210) of the design under test to be checkstopped.

A design under test, as used herein, refers to hardware, including a combination of hardware components, the functionality of which is verified via simulations. A model, as used herein, refers to a representation of the design under test, such as coherence fabric 210 interfaced with L3 cache 209. In one embodiment, such a model of a design under test is created by checkstop engine 301 utilizing various tools, which can include, but are not limited to, Cadence®, Synopsys®, Mentor Graphics®, etc.

In one embodiment, checkstop engine 301 injects errors into a model of the design under test using C++ injectors, which are programs that use a technique called dynamic link library (DLL) injection to run code within another process. DLL injection forces a process to load a dynamic-link library (DLL), which is a shared library of functions and resources.

In one embodiment, such errors are injected at various states causing an occurrence of a checkstop for the first hardware component of the design under test. A "state," as used herein, represents a snap-shot of the modelled design under test, such as at a given cycle where one or more functions are executed. In one embodiment, such cycles are defined by the executing processor's (e.g., processor 201) clock signal. In one embodiment, such errors are injected at random times to cover a state space, i.e., to cover all of the possible states.

Computer 101 further includes driven engine 302 configured to stop the clock signal (e.g., clock signal from processor 201) from being applied to the first hardware component (e.g., coherence fabric 210) of the design under test after the occurrence of the checkstop. That is, driven engine 302 is configured to stop the clock signal (e.g., clock signal from processor 201) from being applied to the first hardware component (e.g., coherence fabric 210) of the design under test after the first hardware component has been checkstopped. In this manner, it can be assured that such a hardware component (e.g., coherence fabric 210) is indeed checkstopped thereby being able to test the interfaced hardware component ("second hardware component") (e.g., L3 cache 209) after the occurrence of the checkstop by the first hardware component (e.g., coherence fabric 210). Furthermore, in this manner, it can be shown that the non-checkstopped component (e.g., L3 cache 209) is not waiting for any traffic and that it will continue to operate even if parts of the logic is checkstopped (e.g., coherence fabric 210).

Furthermore, driven engine 302 is configured to drive random inputs on the interface from the non-checkstopped hardware component ("second hardware component") (e.g., L3 cache 209) to the checkstopped hardware component ("first hardware component") (e.g., coherence fabric 210) of the design under test to confirm that the first hardware component (e.g., coherence fabric 210) of the design under test has been checkstopped and that all clock signals applied to the checkstopped hardware component ("first hardware component") (e.g., coherence fabric 210) of the design under test have been stopped.

Computer 101 additionally includes simulation engine 303 configured to perform a simulation of the model of the design under test with the injected errors for a number of cycles after checkstop based on a quiesce time where the injected errors are suppressed. A quiesce time, as used herein, refers to the amount of time required to render a computer system (e.g., computer 101) inactive. Such a quiesce time may be provided by an expert.

In one embodiment, errors (other than the suppressed errors) that have been identified by simulation engine 303 during the simulation of the model of the design under test are identified and stored. Such errors may then be ignored in a post-processing script, which is used to test the second hardware component of the design under test after checkstop, since such errors were caused due to the first hardware component of the design under test being checkstopped. In this manner, the second hardware component (non-checkstopped hardware component) of the design under test can continue to be tested after the occurrence of a checkstop involving the first hardware component of the design under test that is interfaced with the second hardware component (non-checkstopped hardware component).

In one embodiment, such errors are identified by simulation engine 303 based on identifying values that deviate a user-designated amount from an expected value. Such expected values and user-designated deviations may be provided by an expert.

In one embodiment, simulation engine 303 performs a simulation of the model of the design under test with the injected errors for a number of cycles after checkstop based on a quiesce time where the injected errors are suppressed, and where other errors are identified and stored, using various tools, which can include, but are not limited to, FlexSim®, Simul8®, SimScale®, etc.

Computer 101 further includes testing engine 304 configured to execute a post-processing script to test a model (e.g., stress testing, functional testing, environmental testing, etc.) of the design under test which ignores the errors of the first hardware component (e.g., coherence fabric 210) of the device under test identified after the occurrence of the checkstop in the simulation of the model of the design under test. As discussed above, the errors identified by the simulation of the design under test may be ignored in a post-processing script, which is used to test the second hardware component after checkstop, since such errors were caused due to the first hardware component being checkstopped. A post-processing script, as used herein, is a script that runs after a step finishes, such as after the simulation of the design under test involving a checkstopped hardware component has been completed to ensure that the expected results occur (i.e., that the second hardware component interfaced with the checkstopped first hardware component still works functionally after the occurrence of the checkstop). For example, testing engine 304 may run a post-processing script to perform a cache test to test the operation of the non-checkstopped hardware component, such as L3 cache 209.

In one embodiment, testing engine 304 executes a post-processing script to test a model (e.g., stress testing, functional testing, environmental testing, etc.) of the design under test, including the second hardware component (e.g., L3 cache 209) of the design under test, which ignores the errors identified after the occurrence of the checkstop in the simulation of the model of the design under test using various tools, which can include, but are not limited to, MatLab®. In one embodiment, such a post-processing script is executed by testing engine 304 via a testbench, which corresponds to a container where the design under test is placed and driven with different input stimulus. An example of such a testbench is System Verilog TestBench.

Testing engine 304 is further configured to determine if any non-ignored errors were detected from the execution of the post-processing script. If no such errors were detected, then testing engine 304 outputs an indication that the second hardware component did not fail the test after the occurrence of the checkstop.

If, however, testing engine 304 detected errors (excluding the ignored errors), then such detected errors are analyzed by testing engine 304 to determine if the model of the design under test failed the test after the occurrence of the checkstop.

In one embodiment, such analysis may involve the use of a scoreboard in the testing environment, where the scoreboard uses a reference model that behaves the same way as the design under test. Input sent to the design under test, such as the input that caused the detected error, is also sent to this reference model. If the design under test has a functional problem (i.e., a functional defect), then the output from the design under test will not match the output from the reference model. Otherwise, if the design under test does not have a functional problem (i.e., a functional defect), then the output from the design under test will match the output from the reference model. Based on the comparisons of the outputs from the design and the reference model, a functional defect in the design under test can be detected, which corresponds to failing the test.

If the analyzed error caused the model of the design under test to fail the test, then testing engine 304 outputs an indication that the second hardware component (e.g., L3 cache 209) failed the test after the occurrence of the checkstop. If, however, the analyzed error did not cause the model of the design under test to fail the test, then testing engine 304 outputs an indication that the second hardware component did not fail the test after the occurrence of the checkstop.

In this manner, a hardware component may continue to be tested in an environment involving a checkstop.

A discussion regarding the method for testing hardware in an environment involving a checkstop is provided below in connection with FIG. 4.

Figure 4:
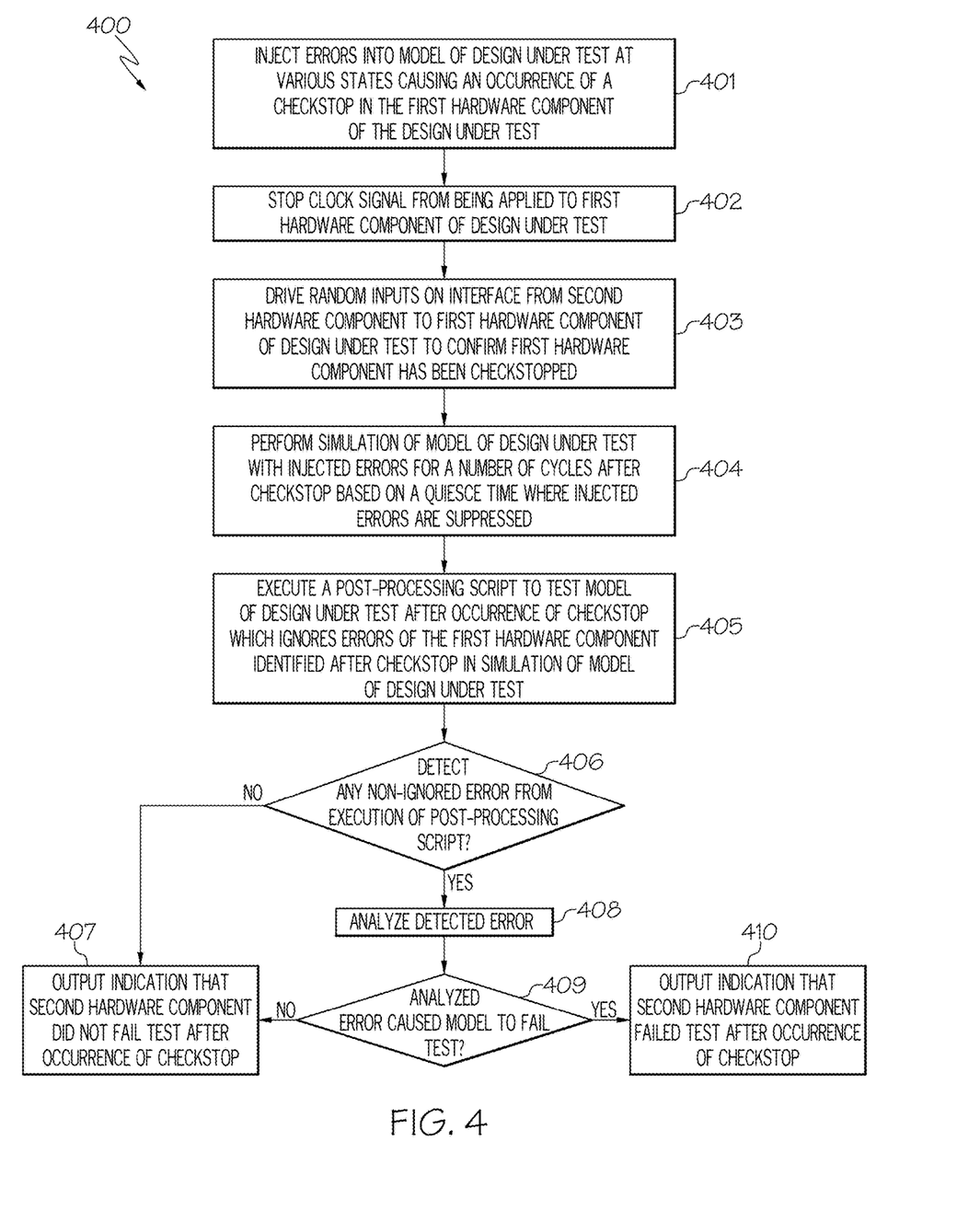
FIG. 4 is a flowchart of a method for testing hardware in an environment involving a checkstop in accordance with an embodiment of the present disclosure.

FIG. 4 is a flowchart of a method 400 for testing hardware in an environment involving a checkstop in accordance with an embodiment of the present disclosure.

Referring to FIG. 4, in conjunction with FIGS. 1-3, in step 401, checkstop engine 301 of computer 101 injects errors into a model of a design under test, which includes a first hardware component (e.g., coherence fabric 210) interfaced with a second hardware component (e.g., L3 cache 209), at various states causing an occurrence of a checkstop in the first hardware component. That is, errors are injected into the model of the design under test to cause the first hardware component (e.g., coherence fabric 210) of the design under test to be checkstopped.

As discussed above, a design under test, as used herein, refers to hardware, including a combination of hardware components, the functionality of which is verified via simulations. A model, as used herein, refers to a representation of the design under test, such as coherence fabric 210 interfaced with L3 cache 209. In one embodiment, such a model of a design under test is created by checkstop engine 301 utilizing various tools, which can include, but are not limited to, Cadence®, Synopsys®, Mentor Graphics®, etc.

In one embodiment, checkstop engine 301 injects errors into a model of the design under test using C++ injectors, which are programs that use a technique called dynamic link library (DLL) injection to run code within another process. DLL injection forces a process to load a dynamic-link library (DLL), which is a shared library of functions and resources.

In one embodiment, such errors are injected at various states causing an occurrence of a checkstop for the first hardware component of the design under test. A "state," as used herein, represents a snap-shot of the modelled design under test, such as at a given cycle where one or more functions are executed. In one embodiment, such cycles are defined by the executing processor's (e.g., processor 201) clock signal. In one embodiment, such errors are injected at random times to cover a state space, i.e., to cover all of the possible states.

In step 402, driven engine 302 of computer 101 stops the clock signal (e.g., clock signal from processor 201) from being applied to the first hardware component (e.g., coherence fabric 210) of the design under test after the occurrence of the checkstop. That is, driven engine 302 is configured to stop the clock signal (e.g., clock signal from processor 201) from being applied to the first hardware component (e.g., coherence fabric 210) of the design under test after the first hardware component has been checkstopped. In this manner, it can be assured that such a hardware component (e.g., coherence fabric 210) is indeed checkstopped thereby being able to test the interfaced hardware component ("second hardware component") (e.g., L3 cache 209) after the occurrence of the checkstop by the first hardware component (e.g., coherence fabric 210). Furthermore, in this manner, it can be shown that the non-checkstopped component (e.g., L3 cache 209) is not waiting for any traffic and that it will continue to operate even if parts of the logic is checkstopped (e.g., coherence fabric 210).

In step 403, driven engine 302 of computer 101 drives random inputs on the interface from the non-checkstopped hardware component ("second hardware component") (e.g., L3 cache 209) to the checkstopped hardware component ("first hardware component") (e.g., coherence fabric 210) of the design under test to confirm that the first hardware component (e.g., coherence fabric 210) of the design under test has been checkstopped and that all clock signals applied to the checkstopped hardware component ("first hardware component") (e.g., coherence fabric 210) of the design under test have been stopped.

In step 404, simulation engine 303 of computer 101 performs a simulation of the model of the design under test with the injected errors for a number of cycles after checkstop based on a quiesce time where the injected errors are suppressed. A quiesce time, as used herein, refers to the amount of time required to render a computer system (e.g., computer 101) inactive. Such a quiesce time may be provided by an expert.

As discussed above, in one embodiment, errors (other than the suppressed errors) that have been identified by simulation engine 303 during the simulation of the model of the design under test are identified and stored. Such errors may then be ignored in a post-processing script, which is used to test the second hardware component of the design under test after checkstop, since such errors were caused due to the first hardware component of the design under test being checkstopped. In this manner, the second hardware component (non-checkstopped hardware component) of the design under test can continue to be tested after the occurrence of a checkstop involving the first hardware component of the design under test that is interfaced with the second hardware component (non-checkstopped hardware component).

In one embodiment, such errors are identified by simulation engine 303 based on identifying values that deviate a user-designated amount from an expected value. Such expected values and user-designated deviations may be provided by an expert.

In one embodiment, simulation engine 303 performs a simulation of the model of the design under test with the injected errors for a number of cycles after checkstop based on a quiesce time where the injected errors are suppressed, and where other errors are identified and stored, using various tools, which can include, but are not limited to, FlexSim®, Simul8®, SimScale®, etc.

In step 405, testing engine 304 of computer 101 executes a post-processing script to test a model (e.g., stress testing, functional testing, environmental testing, etc.) of the design under test which ignores the errors of the first hardware component identified after the occurrence of the checkstop in the simulation of the model of the design under test. As discussed above, the errors identified by the simulation of the design under test may be ignored in a post-processing script, which is used to test the second hardware component after checkstop, since such errors were caused due to the first hardware component being checkstopped.

As stated above, a post-processing script, as used herein, is a script that runs after a step finishes, such as after the simulation of the design under test involving a checkstopped hardware component has been completed to ensure that the expected results occur (i.e., that the second hardware component interfaced with the checkstopped first hardware component still works functionally after the occurrence of the checkstop). For example, testing engine 304 may run a post-processing script to perform a cache test to test the operation of the non-checkstopped hardware component, such as L3 cache 209.

In one embodiment, testing engine 304 executes a post-processing script to test a model (e.g., stress testing, functional testing, environmental testing, etc.) of the design under test, including the second hardware component (e.g., L3 cache 209) of the design under test, which ignores the errors identified after the occurrence of the checkstop in the simulation of the model of the design under test using various tools, which can include, but are not limited to, MatLab®. In one embodiment, such a post-processing script is executed by testing engine 304 via a testbench, which corresponds to a container where the design under test is placed and driven with different input stimulus. An example of such a testbench is System Verilog TestBench.

In step 406, testing engine 304 of computer 101 determines if any non-ignored errors were detected from the execution of the post-processing script.

If no such errors were detected, then, in step 407, testing engine 304 of computer 101 outputs an indication that the second hardware component did not fail the test after the occurrence of the checkstop.

If, however, testing engine 304 detected errors (excluding the ignored errors), then, in step 408, testing engine 304 of computer 101 analyzes such detected errors to determine if the model of the design under test failed the test after the occurrence of the checkstop.

As discussed above, in one embodiment, such analysis may involve the use of a scoreboard in the testing environment, where the scoreboard uses a reference model that behaves the same way as the design under test. Input sent to the design under test, such as the input that caused the detected error, is also sent to this reference model. If the design under test has a functional problem (i.e., a functional defect), then the output from the design under test will not match the output from the reference model. Otherwise, if the design under test does not have a functional problem (i.e., a functional defect), then the output from the design under test will match the output from the reference model. Based on the comparisons of the outputs from the design and the reference model, a functional defect in the design under test can be detected, which corresponds to failing the test.

In step 409, testing engine 304 of computer 101 determines if the analyzed error caused the model of the design under test to fail the test based on the analysis of the detected error.

If the analyzed error caused the model of the design under test to fail the test, then, in step 410, testing engine 304 of computer 101 outputs an indication that the second hardware component (e.g., L3 cache 209) failed the test after the occurrence of the checkstop.

If, however, the analyzed error did not cause the model of the design under test to fail the test, then, in step 407, testing engine 304 outputs an indication that the second hardware component (e.g., L3 cache 209) did not fail the test after the occurrence of the checkstop.

In this manner, a hardware component may continue to be tested in an environment involving a checkstop.

Furthermore, the principles of the present disclosure improve the technology or technical field involving testing hardware components.

As discussed above, electronic components or systems are tested for its functionality, performance, or other specifications. The purpose of the testing is to ensure that such components or systems meet the desired standards, identify any defects, and improve its design or quality. Examples of such testing include stress testing, functional testing, and environmental testing to ensure that the components or systems fully comply with design specifications and industry standards. Such components or systems being tested may be subjected to a checkstop. A checkstop is a machine check that occurs during another machine check. A checkstop also occurs when the machine (usually a processor but sometimes a cache, memory, or I/O bus controller) determines that something is in an "impossible" state. For example, a checkstop results when an error occurs that cannot be isolated to a particular bus transfer in progress, or when a processor detects no progress being made. In another example, a checkstop results when the processor is not able to complete any instructions for some period of time. When a system checkstops, the clocks in the machine are frozen within a few cycles after the error and the service processor saves the part of the state of the processors. It then attempts to perform a full hardware reset and restart the system a number of times. When the system reboots, the data is copied to a file, such as in the/usr/lib/ras directory (ras stands for reliability and service). Two file names (checkstop.A and checkstop.B) may be used in a rotating manner. The total number of checkstops that occurred during the reboot attempts, before the system came up successfully, is logged in the error log entry along with the file name. If a second machine check occurs before the operating system completes logging the error and initiates a complete hardware reset or halts, the processor will checkstop. After the occurrence of a checkstop in which the computer system is forcibly rebooted, testing of the hardware of the computer system is prevented, including other hardware components that may not be directly involved with the error causing the checkstop. For example, even in the scenario in which two hardware components are interfaced together and only one of the hardware components were involved with the error causing the checkstop, the further testing of the other hardware component cannot be performed. Hence, there is no existing methodology to continue to test hardware components after a checkstop.

Embodiments of the present disclosure improve such technology by injecting errors into a model of a design under test, which includes a first hardware component (e.g., coherence fabric) interfaced with a second hardware component (e.g., L3 cache), at various states (representing a snap-shot of the modelled component at a given cycle) causing an occurrence of a checkstop in the first hardware component. A simulation of the model of the design under test is then performed with the injected errors for a number of cycles after the checkstop based on a quiesce time (amount of time required to render a computer system inactive) where the injected errors are suppressed. A post-processing script may then be executed to test (e.g., functional testing) a model of the design under test which ignores the errors of the first hardware component that were identified after the checkstop in the simulation of the model of the design under test. Any non-ignored errors from the execution of the post-processing script are detected and analyzed. Based on the analysis of such errors, a determination is made as to whether such an error would cause the model of the design under test to fail the test. If the analyzed error causes the model of the design under test to fail the test, an indication is outputted indicating that the second hardware component failed the test. Otherwise, an indication is outputted indicating that the second hardware component did not fail the test. In this manner, a hardware component may continue to be tested in an environment involving a checkstop. Furthermore, in this manner, there is an improvement in the technical field involving testing hardware components.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for testing hardware in an environment involving a checkstop, the method comprising:
   injecting errors into a model of a design under test comprising a first hardware component and a second hardware component at various states causing an occurrence of a checkstop in said first hardware component, wherein said first hardware component is interfaced with said second hardware
   performing a simulation of said model of said design under test with said injected errors for a number of cycles after said checkstop based on a quiesce time where said injected errors are suppressed;

executing a post-processing script to test said model of said design under test which ignores errors of said first hardware component that were identified after said checkstop in said simulation of said model of said design under test;

analyzing a non-ignored error from said execution of said post-processing script; and outputting an indication that said second hardware component failed said test after said occurrence of said checkstop in response to said analyzed error causing said model of said design under test to fail said test.

2. The method as recited in claim 1, wherein said injected errors are injected using dynamic-link library injection to run code within another process.

3. The method as recited in claim 1, wherein said injected errors are injected at random times to cover a state space.

4. The method as recited in claim 1 further comprising:
outputting an indication that said second hardware component did not fail said test after said occurrence of said checkstop in response to said analyzed error not causing said model of said design under test to fail said test.

5. The method as recited in claim 1 further comprising:
stopping a clock signal from being applied to said first hardware component after said occurrence of said checkstop.

6. The method as recited in claim 5 further comprising:
driving random inputs on an interface from said second hardware component to said first hardware component to confirm that said first hardware component has been checkstopped.

7. The method as recited in claim 1, wherein said first hardware component corresponds to a coherence fabric and said second hardware component corresponds to a level 3 cache.

8. A computer program product for testing hardware in an environment involving a checkstop, the computer program product comprising one or more computer readable storage mediums having program code embodied therewith, the program code comprising programming instructions for:
injecting errors into a model of a design under test comprising a first hardware component and a second hardware component at various states causing an occurrence of a checkstop in said first hardware component, wherein said first hardware component is interfaced with said second hardware performing a simulation of said model of said design under test with said injected errors for a number of cycles after said checkstop based on a quiesce time where said injected errors are suppressed;

executing a post-processing script to test said model of said design under test which ignores errors of said first hardware component that were identified after said checkstop in said simulation of said model of said design under test;

analyzing a non-ignored error from said execution of said post-processing script; and outputting an indication that said second hardware component failed said test after said occurrence of said checkstop in response to said analyzed error causing said model of said design under test to fail said test.

9. The computer program product as recited in claim 8, wherein said injected errors are injected using dynamic-link library injection to run code within another process.

10. The computer program product as recited in claim 8, wherein said injected errors are injected at random times to cover a state space.

11. The computer program product as recited in claim 8, wherein the program code further comprises the programming instructions for:
outputting an indication that said second hardware component did not fail said test after said occurrence of said checkstop in response to said analyzed error not causing said model of said design under test to fail said test.

12. The computer program product as recited in claim 8, wherein the program code further comprises the programming instructions for:
stopping a clock signal from being applied to said first hardware component after said occurrence of said checkstop.

13. The computer program product as recited in claim 12, wherein the program code further comprises the programming instructions for:
driving random inputs on an interface from said second hardware component to said first hardware component to confirm that said first hardware component has been checkstopped.

14. The computer program product as recited in claim 8, wherein said first hardware component corresponds to a coherence fabric and said second hardware component corresponds to a level 3 cache.

15. A system, comprising:
a memory for storing a computer program for testing hardware in an environment involving a checkstop; and
a processor connected to said memory, wherein said processor is configured to execute program instructions of the computer program comprising:
injecting errors into a model of a design under test comprising a first hardware component and a second hardware component at various states causing an occurrence of a checkstop in said first hardware component, wherein said first hardware component is interfaced with said second hardware component;
performing a simulation of said model of said design under test with said injected errors for a number of cycles after said checkstop based on a quiesce time where said injected errors are suppressed;
executing a post-processing script to test said model of said design under test which ignores errors of said first hardware component that were identified after said checkstop in said simulation of said model of said design under test;
analyzing a non-ignored error from said execution of said post-processing script; and
outputting an indication that said second hardware component failed said test after said occurrence of said checkstop in response to said analyzed error causing said model of said design under test to fail said test.

16. The system as recited in claim 15, wherein said injected errors are injected using dynamic-link library injection to run code within another process.

17. The system as recited in claim 15, wherein said injected errors are injected at random times to cover a state space.

18. The system as recited in claim 15, wherein the program instructions of the computer program further comprise:
outputting an indication that said second hardware component did not fail said test after said occurrence of said checkstop in response to said analyzed error not causing said model of said design under test to fail said test.

19. The system as recited in claim 15, wherein the program instructions of the computer program further comprise:

stopping a clock signal from being applied to said first hardware component after said occurrence of said checkstop.

20. The system as recited in claim 19, wherein the program instructions of the computer program further comprise:

driving random inputs on an interface from said second hardware component to said first hardware component to confirm that said first hardware component has been checkstopped.

\* \* \* \* \*